Oct. 10, 1961 P. M. LUCAS ET AL 3,004,109

HIGH SPEED MEMORY TESTING DEVICE

Filed Oct. 9, 1959 3 Sheets-Sheet 1

INVENTORS
PIERRE M. LUCAS AND MICHEL M ROUZIER

BY Abraham A. Saffitz
ATTORNEY

Oct. 10, 1961 P. M. LUCAS ET AL 3,004,109

HIGH SPEED MEMORY TESTING DEVICE

Filed Oct. 9, 1959 3 Sheets-Sheet 2

INVENTORS
PIERRE M. LUCAS AND MICHEL M. ROUZIER
BY Abraham A. Saffitz
ATTORNEY

HIGH SPEED MEMORY TESTING DEVICE

Filed Oct. 9, 1959 3 Sheets-Sheet 3

INVENTORS
PIERRE M. LUCAS AND MICHEL M. ROUZIER

BY Abraham A. Saffitz

ATTORNEY 3,004,109

HIGH SPEED MEMORY TESTING DEVICE

Pierre Marie Lucas, 11 Rue Abbé Derry, Issy-les-Moulineaux, France, and Michel Marcel Rouzier, 22 Chemin des Postes, Clichy-sous-Bois, France Filed Oct. 9, 1959, Ser. No. 845,555
Claims priority, application France Oct. 29, 1958
3 Claims. (Cl. 179—18)

The present invention relates to the reading of information out of memory matrices and more particularly to a testing device of telephone channels as regards their service condition.

It is known that the determination of whether a telephone channel is idle or busy may be derived from the presence or absence of a direct or alternating current at a given point of said channel and that the corresponding information may be temporarily stored in a matrix in binary coded form.

More particularly, it is common practice in testing a group of telephone channels to associate to each channel of the group a detection element constituting a temporary store capable of assuming one or other of two electrical conditions according to whether the channel is idle or busy, to associate these detection elements in rows and columns to form a matrix of which they constitute the crosspoints, and to test the electrical condition of these crosspoints by means of reading pulses applied to the rows of the matrix. In these systems all the crosspoints situated on a particular row and of which the binary coded information constitutes a particular word are tested simultaneously and there result as many output digits as there are columns of the matrix.

Such memory matrices, in which a complete word consisting of many binary digits, each in its own separate column, is operated by application of reading pulses necessitate, for the reading out of a single binary digit, means for scanning the column outputs within a cycle equal to or lesser than the reading pulse duration.

The testing device hereinafter described essentially comprises:

(1) A plurality of detection elements arranged in rows and in columns and forming a marking matrix, each of these elements being associated with one of the telephone channels of which it is desired to ascertain the service condition;

(2) An address register divided into several parts in which the number of the unit which it is desired to read out can be represented;

(3) A decoding device placed under the control of the address register and divided into as many parts as the address register;

(4) Transistor access matrices actuated by decoders and giving access to the rows and the columns of the marking matrix;

(5) An output device providing on a single output terminal and in appropriate form the result of the reading of the given detection device.

The object of the invention is to provide a high speed testing device with only a single output terminal.

Another object of the invention is to allow a reading out which is completely non-rhythmic and which does not rely upon any sequential arrangement. In other words, the device for reading out memory matrices according to the invention enables the serial reading out of binary digits, the addresses of which have no relationship to each other; it is only necessary to provide the register successively (through the intermediary of a calculating device of known type) with the said addresses in the desired order.

A feature of the invention is that the crosspoints of the matrices giving access to the rows and columns of the marking matrix are transistors the switching is always controlled from the base and not from the emitter. It is thus possible to use transistors functioning at saturation and consequently providing calibrated output signals, while maintaining great speed of operation; the result of the accumulation, on the bases of the transistors, of minority carriers capable of retarding the switching operation is in fact very limited by this driving method.

A further feature of the invention is that the essential member of each of the detection elements constituting the marking matrix is a condenser and that only the condenser of the detection element individually selected for a reading operation is discharged by this operation.

In order that the invention may be better understood, there will now be given in the following detailed description in conjunction with the attached drawings in which:

FIG. 1 shows, in block form, a diagram illustrating the principle of the testing device which is the subject of the present invention;

FIG. 2 provides, by way of example, details of the construction of a diode decoder, a transistor access matrix, a detecting cell adapted for use when the physical phenomenon to be detected is an alternating current of frequency $f$ and an output gate for the testing device.

Figure 1:
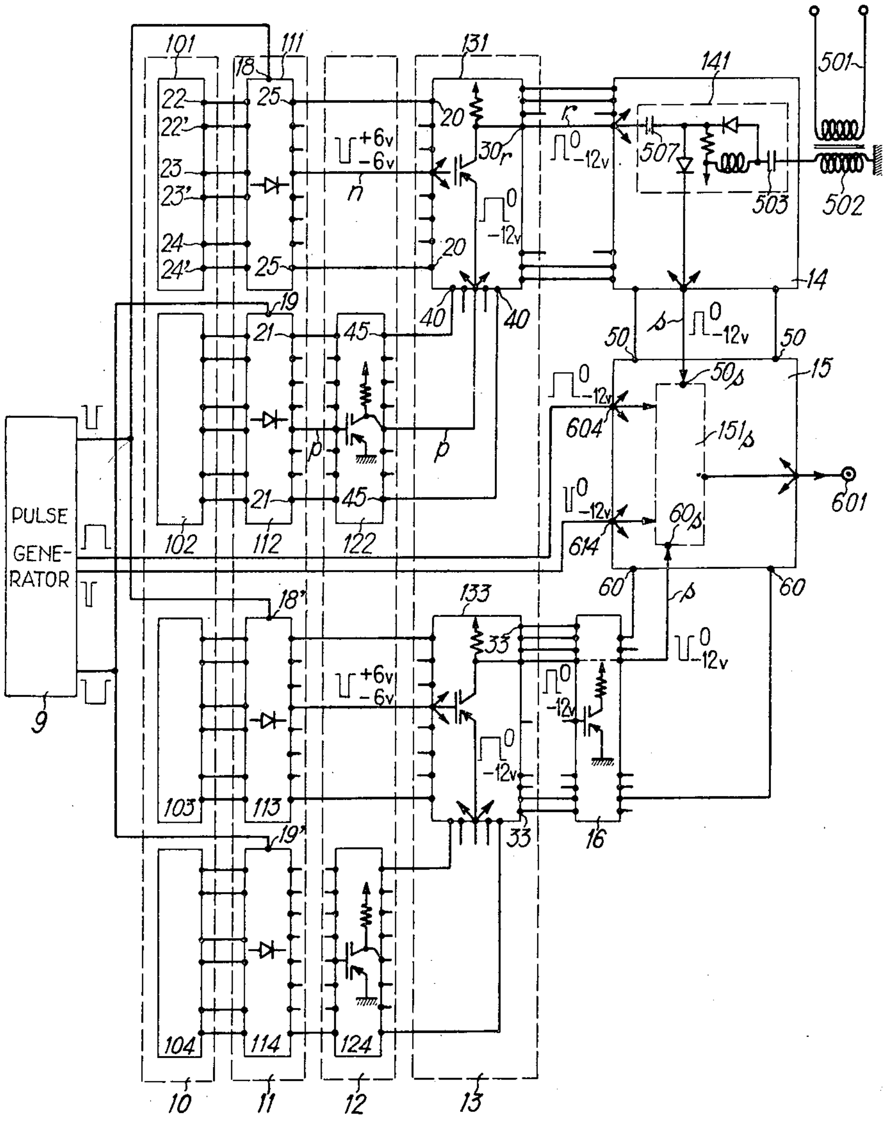

FIG. 1 represents, in block form, a diagram of the operation of the testing device of the invention by way of example, and arranged to discover if a selected line among $2^{12}=4.096$ telephone lines such as 501 is transmitting or is not transmitting a given frequency signal. Each line 501 determines, through a coupling member 502, the condition of a detection member or cell 141 capable of assuming one or other of two alternative conditions in response to the presence or absence of said signal. The cells 141 are disposed in rows and columns to constitute a marking matrix 14.

FIG. 1 shows:

(1) A register means 10 consisting of a certain number of trigger circuits serving to represent in binary coding the number of the detector unit which it is desired to test.

This register means 10 is divided into four identical parts, a first register 101 and a second register 102 to indicate respectively the digits of lower order and the digits of higher order of the numbers of the rows of the marking matrix 14; a third register 103 and a fourth register 104 to indicate respectively the digits of lower order and the digits of higher order of the numbers of the columns of the marking matrix 14. In the example chosen, where the matrix 14 comprises 4096 crosspoints, each of the four registers 101–104 is made up of three trigger circuits.

(2) A decoding device comprising:

(*a*) A diode decoder stage 11 driven from the output circuits of the trigger circuits of the register means 10 and divided like this unit into four similar decoders 111 to 114, placed under the control of a pulse generator 9.

(*b*) A transistor amplifying and inverting stage 12 divided into two parts 122 and 124 which follows respectively the two diode decoders 112 and 114;

(*c*) A transistor matrix stage 13 composed of two access matrices to the marking matrix, that is to say: a matrix 131 giving access to the rows driven on the one hand by the outputs of the diode decoder 111, and on the other hand by the outputs of the inverter-amplifier 122, and a matrix 133 giving access to the columns driven in the same way by the outputs of 113 and 124;

(3) A matrix of detection cells or marking matrix 14 which is driven on the side of the rows by the outputs of the row access matrix 131 and the output circuits or columns of which terminate at the output member 15, which is defined below in paragraph (4).

(4) An output member 15 which receives on the one hand the output circuits of the detector matrix 14, and on the other hand the output circuits of the column access matrix 133 through the intermediary of the inverter-amplifier 16.

When it is desired to obtain the information provided by a detection cell in the marking matrix 14, the trigger circuits of register means 10 are first set, by means of connections not shown in FIG. 1, in accordance with the binary number of the cell in question. The first and second registers 101, 102 of the register means 10 define the row of the matrix 14, and the third and fourth registers 103, 104 define the column of the matrix 14. Reading control pulses or test pulses applied through the pulse generator 9 to the decoders 111 and 112 are directed by the upper part 111, 112, 122, 131 of the decoding device on the row of the matrix 14 which contains the detection cell in question. In similar manner the lower part 113, 114, 124, 133 of the decoding device ensures the marking of the output corresponding to the column of the matrix 14 in which the cell in question is located.

In order to avoid discharging the capacitors contained in the detection cells situated on the same row of the matrix as the selected detection cell, all the columns except that which contains the selected detection cell are subjected, as will be explained later, to a pulse known as a protection pulse. Finally, the output device 15 provides on the single output terminal 601 a pulse representative of the state of the tested cell.

Figure 2:
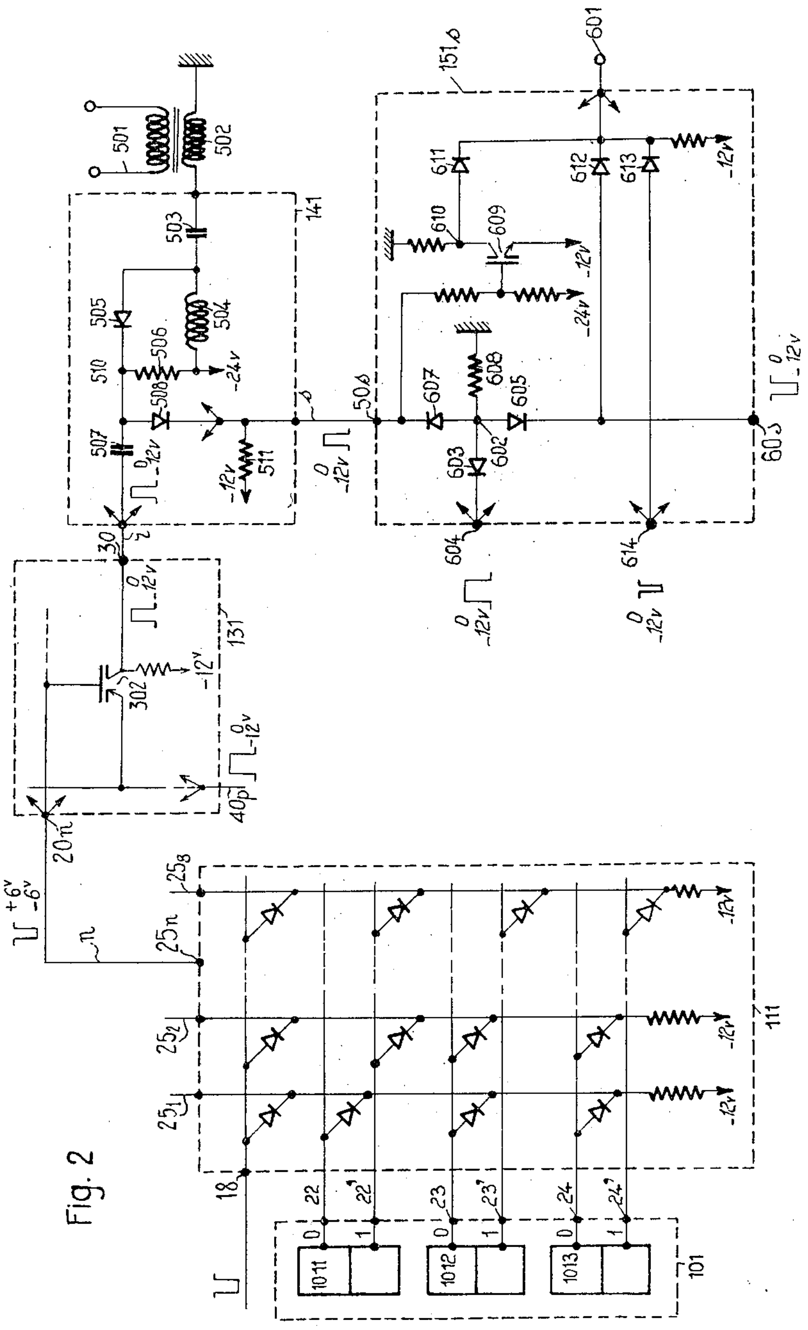

In FIG. 2 there is shown in greater detail one of the registers 101 of the register means 10 and one of the decoders 111 of the diode decoder stage 11. All the trigger circuits 1011, 1012, 1013 . . . of the register 101 are identical and their circuit diagrams are of conventional form.

The outputs 0 and 1 of these trigger circuits are indicated at 22, 22′, 23, 23′, 24, 24′, and have two different potentials according to the state of the said trigger circuits. As an example, it will be supposed that the values of these potentials are +6 volts and —6 volts.

The decoder 111 is a diode matrix of conventional form.

A reading control pulse provided by the pulse generator 9 (FIGURE 1) is introduced into the decoder 111 through the input terminal 18. This pulse is set between +6 volts and —6 volts. In the rest condition, the input terminal 18 has a potential of +6 volts and this potential is transmitted to the eight output conductors $25_1$ to $25_8$ of the decoder 111.

For the duration of the negative reading pulse the potential at the input terminal 18 is —6 volts. Each of the outputs $25_1$ to $25_8$ then has a potential of —6 volts if the three input terminals 22 or 22′, 23 or 23′ and 24 or 24′ to which it is connected are at —6 volts, and it remains at a potential of +6 volts if this is not so.

It will be seen that the pulse applied to conductor 18 is thus directed by the decoder 111 as a function of the condition of the trigger circuits 1011, 1012 and 1013, for example to the output $25_1$ when they are in the zero condition, to the output $25_2$ when they represent 100 and to the output $25_8$ when they represent 111.

The decoders 112, 113 and 144 are identical with the decoder 111. The decoder 113 receives from the pulse generator 9 through its input terminal 18′, a reading control pulse simultaneous with the pulse applied at the terminal 18 of the decoder 111 and of the same duration. The decoders 112 and 114 receive from the pulse generator 9 through their input terminals 19 and 19′ simultaneous reading control pulses which are larger than the pulses applied at 18 and 18′ and enclose them. The object of this arrangement is to obtain a high speed of switching in the later stages, as will be explained later.

Figure 3:
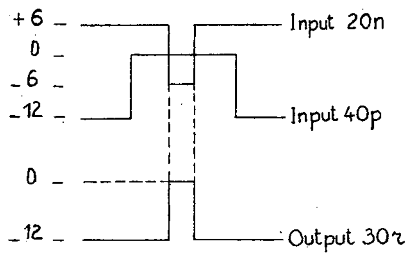
FIG. 3 shows the relative amplitudes and the directions of the pulses at the inputs and outputs of the transistor access matrix shown in FIG. 2.

FIG. 2 also shows an element of one of the transistor access matrices 131 and 133 which are identical with one another. Each of these elements constituting a crosspoint of the matrix in question is an "and-gate" comprising a transistor 302 of the P–N–P type, for example, the base of which receives, through an input 20 a connection such as $n$ from the output $25_n$ of the diode decoder 111 and the emitter of which is connected to an input such as $40_p$ coming from the inverter-amplifier 122 (FIG. 1). The outputs such as $30_r$ of the row access matrix 131 are taken from the collectors of the transistors. The potentials existing at these three electrodes of the transistor 302 are indicated in FIGS. 2 and 3. The base is normally at +6 volts, except when a negative pulse is applied over the connection $n$, in which case it goes to —6 volts. The emitter is normally at —12 volts, except when a pulse applied over the connection $p$ raises the said emitter to zero potential. It will be seen that the base becomes negative with respect to the emitter only in the case when these two input pulses coincide; in this case, the transistor 302 conducts and goes to saturation; its collector which is normally at —12 volts goes to zero potential, thereby applying a positive pulse to the output $30_r$. In all other cases, the transistor 302 is non-conducting and consumes no power. The consumption of power in the access matrices 131 and 133 (FIGS. 1 and 2) is thus limited to the current which saturates the only transistor of each matrix which is selected, and only for the common part of the duration of the two pulses applied to the inputs $20_n$ and $40_p$.

The transistor 302 being saturated, the output pulse is thus perfectly calibrated without requiring auxiliary devices such as blocking diodes. It is known that when a transistor is saturated, its period of switching between the saturation zone and the non-conducting zone may be greatly prolonged by the phenomenon of accumulation of minority charge carriers in the base.

To reduce the blocking period, the pulse applied to the base connection $n$ falls wholly within the larger pulse applied to the emitter connection $p$, as shown in FIG. 3. Thus the switching of the transistor 302 is uniquely controlled by the pulse applied to its base and when this pulse ends, the said base being returned to +6 volts, the excess charge carriers find a path, for example through the unblocked diode or diodes of the decoder 111, and can flow away rapidly. This would not happen if the pulse applied to the base of the transistor 302 were larger than the pulse applied to its emitter.

The operation of the testing device will now be clear from the following:

A command for setting the trigger circuits of the register 10, which is provided by an external calculator, can be made in any manner, either with each trigger circuit operated individually and all the trigger circuits set simultaneously by a corresponding number of parallel control circuits, or with the register arranged as a counter, the operation being effected sequentially by applying a certain number of pulses which increase by that number the value contained initially in the register.

Whichever way is used, the trigger circuits of the register 10 being set, the reading phase is initiated by applying to the decoders 111 to 114 test pulses on their inputs 18, 19 and 18′, 19′, the pulses applied on 19 and 19′ being, as already stated, longer than the pulses applied on 18 and 18′ and enclosing them.

The cycle can be restarted for another test as soon as the two conducting transistors in the matrices 131 and 133 (FIGURE 1) are properly non-conducting again; this period of time is a few tenths of a microsecond. If the cycle of tests is well defined and if it is not necessary, for example, to wait for the result of the current reading operation to set the trigger circuits of the register 10 to the next address, the tests will continue without interruption. If, on the contrary, the result of the reading operation must be taken into account to effect certain dependent operations before passing to the test of another member, the interval of time necessary for these various operations will separate successive tests.

Each output of the decoders 111 and 113 applies, during the reading pulses, +6 volts or —6 volts as a function of the contents of the registers 101 and 103 to the bases of all the transistors constituting a row in the access matrices 131 and 133. Each output of the decoders 112 and 114, is similarly, during the marking pulses applied to terminals 19 and 19', at a potential of +6 volts or —6 volts as a function of the contents of the registers 102 and 104, but this potential must be first transformed in the inverter-amplifier 122 and 124 and then applied at the emitters of all the transistors constituting a column in the access matrices 131 and 133.

Figure 4:
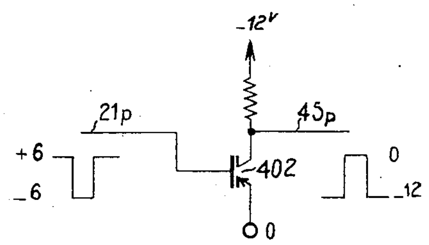
FIG. 4 shows an inverter-amplifier.

FIG. 4 shows one of the elements of these similar inverter-amplifiers, which elements are identical with each other. The circuit diagram is similar to that of the transistors of the access matrices. The only difference is that the emitter is permanently at zero potential.

The operation is therefore the same: for example, a negative pulse set to be between +6 and —6 volts and applied through conductor $\mathbf{21}_p$ to the base of the transistor 402 is inverted and adjusted to be between —12 volts and zero at its collector. The output $\mathbf{45}_p$ can then be applied directly to the emitters of the transistors of the access matrix 131.

In the access matrix 131, the collector of the transistor such as 302 which receives simultaneously a positive pulse from 122 at its emitter, and a negative pulse from 111 at its base, transmits a positive pulse through the conductor $\mathbf{30}_r$ to all the detection cells 141 which constitute the row *r* in the marking matrix 14.

Figure 5:
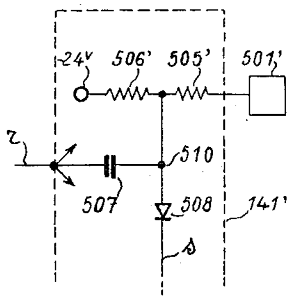
FIG. 5 illustrates a modification of the detecting cell shown in FIG. 2 for use when the physical phenomenon to be detected is the presence of a small direct current.

In FIG. 2, the unit 141 represents one of the detection cells of the marking matrix 14 when the physical phenomenon to be detected, for example, is the presence of an alternating current of a given frequency *f* on a telephone line represented at 501. FIG. 5 shows a modification of this detection cell which is applicable when the phenomenon to be detected is the presence of a small direct current provided by a measuring device 501' and passing through a resistance 505' of high value.

The cells 141 of a single column of the marking matrix 14 are connected to one of the inputs 50 of a single output device 151 of the unit 15 by a conductor such as *s* (FIG. 1). Thus the detection cell 141 of the row *r* appertaining to the column *s* is connected to the input $\mathbf{50}_s$ of the output member $\mathbf{151}_s$ (FIG. 2).

The telephone line 501 is connected to a low output impedance transformer 502 which transmits the alternating current of the said telephone line to a series resonant circuit tuned to the frequency *f* to be detected and consisting of the condenser 503 and the inductance 504. A high impedance detector unit is connected to the terminals of inductance 504 and includes a diode 505, a resistor 506 and a condenser 507. When a signal at the frequency *f* is present in the line, the circuit 503—504 becomes resonant; as a result, a rectified current flows through the resistor 506 and charges the condenser 507. This condenser, which is connected to the terminal $\mathbf{30}_r$ of the row *r* which, in the absence of a reading pulse from the access matrix 131 is at a potential of —12 volts, cannot charge to more than a certain value. If the amplitude of the signal at frequency *f* becomes such that the point 510 (which in the rest condition is at —24 volts) tends to exceed the potential of —12 volts, a voltage limitation comes into operation owing to the presence of the diode 508 which is connected through a resistor 511 (of value much lower than that of 506) to a potential of —12 volts.

As a result, in the absence of a signal at the frequency *f*, the point 510 is at —24 volts and in the presence of this signal the point 510 is raised to the neighborhood of —12 volts.

When a positive pulse of 12 volts is applied by the access matrix 131 to the line *r*, the potential of the point 510 follows this increase in voltage. However, if initially the said point 510 was at —24 volts, it will not be able to reach a potential sufficient to unblock the diode 508 and the pulse is not transmitted to the input $\mathbf{50}_s$ of the output gate $\mathbf{151}_s$. If, on the other hand, the potential of the point 510 was already in the neighborhood of —12 volts as a consequence of the detection of a signal of frequency *f*, the increase of potential is sufficient to unblock the diode 508 and the positive pulse is transmitted to the terminal $\mathbf{50}_s$. This pulse therefore represents the fact that the tested detection cell 141 is in the condition corresponding to the presence of a signal of frequency *f*.

The operation of the detector of FIG. 5 is exactly similar. It is only necessary to replace the rectified current passing through the resistor 506 by the direct current of low value which passes through the resistor 506' and is provided by the measuring device 501' through the resistor 505'.

The output unit 15 comprises as many elements 151 as there are columns in the marking matrix 14. This is also the number of outputs such as 33 in the access matrix 133. This output unit 15 therefore comprises as many input terminals 50 of the one part, and 60 of the other part, as there are columns in the marking matrix 14 and lastly it comprises a common output 601.

In FIG. 2 the input terminal $\mathbf{50}_s$ of the element $\mathbf{151}_s$ is connected to the output of a column of the matrix 14 of detector cells 141. It therefore receives a positive pulse at the moment of test if the detector cell in question provides a positive response. The input terminal $\mathbf{60}_s$ is connected to an inverter-amplifier 16, similar to that of FIG. 4. In the rest condition, the transistors of the inverter-amplifier 16, which have their bases at —12 volts, are conducting and the potential of their collectors is in the neighborhood of zero. When a positive pulse is transmitted through the output $\mathbf{33}_s$ of the column access matrix 133 which selects the column *s* of the matrix 14, the corresponding transistor is rendered non-conducting and applies to the terminal $\mathbf{60}_s$ a negative pulse going from 0 to —12 volts. This pulse results from the pulse which is applied at the moment of test to the input 18' of the diode decoder 113 (FIG. 1). This latter pulse is simultaneous with that applied to the input 18 of the decoder 111. Consequently at the moment of test the element 151 (FIGS. 1 and 2) which corresponds to the column *s* of the matrix 14 in question, receives two pulses: a negative pulse at the input $\mathbf{60}_s$ and a positive pulse at the input $\mathbf{50}_s$; but this occurs only when the detector in question (that is to say that which is connected to the marking matrix row *r* marked by the access matrix 131 and which is in the marking matrix column *s* corresponding to the element $\mathbf{151}_s$) provides a positive response.

In order to avoid discharging the condensers 507 of the detector cells with which the test is not directly concerned, a protective pulse is applied to the elements 151, this pulse being cancelled for the selected column. It is obvious that the protective signal cannot be applied permanently, because the limitation of the signal to be detected, mentioned above, would disappear.

At the input terminal 604 which is common to all the elements 151 there is applied a positive pulse going from —12 volts to zero. This pulse is supplied by the pulse generator 9 at the same time as the large test pulse applied to the terminals 19 and 19' of the decoders 112 and 114. As a consequence, it encloses the negative pulse which corresponds to the selected column *s* and is applied to the terminal $\mathbf{60}_s$.

The protective pulse results from the coincidence between the above-mentioned positive pulse applied to the terminal 604 and the absence of a negative pulse at the individual terminal 60.

If the element 151 does not belong to the selected column *s*, the potentials of the terminals 604 and 60 will be zero at the moment of test. In these conditions, the potential of the conductor 50 becomes zero and in the corresponding marking crosspoint 141, the diode 508 cannot be rendered conducting during the pulse. Thus, although a test pulse is applied to the connection *r* of the detection cell 141, the condenser 507 will not be able to discharge since the protective pulse blocks the diode 508 through which it would discharge. As a result the charges of the condensers which do not belong to the tested detection cell will not be disturbed.

If now the element 151 is that which corresponds to the selected column *s* of the marking matrix 14, the protective pulse is cancelled. The input terminal $60_s$, at the moment of test, is at a potential of −12 volts owing to the presence of the particular negative pulse applied to this terminal and as a consequence, although the diode 603 is rendered non-conductive, the diode 605 remains non-conductive and the potential of the point 602 remains at −12 volts. In these conditions, the diode 607 also remains non-conductive and serves no function. As a consequence, if in the selected detector 141 the presence of the signal frequency *f* has charged the condenser 507, the test pulse applied to the terminal $30_r$ will be able to discharge the condenser through the diode 508. There will thus be found a positive pulse at the base of the N-P-N transistor 609. If on the other hand in the same detector the signal frequency *f* is absent and as a consequence the condenser 507 is not charged, no positive pulse will exist at the base of transistor 609.

To summarize these conditions of operation, it can be stated that the only case when there is no positive pulse at the base of the transistor 609 of an element 151, is that in which this element is the one which is associated with the selected matrix column and in which in addition the detector 141 selected in this same column provides a negative test, that is to say it indicates, for example, the absence of a signal at frequency *f*.

In all other cases a positive pulse exists at the base of transistor 609. This pulse can result either from the passage of the protective pulse applied at 602 through the diode 607 (it then indicates an element corresponding to a column which has not been selected); or from the passage of the test pulse in the selected detector 141, through the diode 508, as a consequence of the detection of a signal at frequency *f* having charged the condenser 507 of the selected detector.

The second part of the element 151 shown in FIG. 2 is an "and-gate" having three inputs comprising the diodes 611, 612 and 613 and controlling the output 601. The diode 611 receives a negative pulse which is only the pulse previously mentioned inverted and adjusted in level by the transistor inverter-amplifier 609.

The diode 612 receives the negative pulse pertaining to the element 151 of the selected column and which is applied to the input terminal $60_s$.

The diode 613 receives a short negative pulse going from zero to −12 volts, which is applied by the pulse generator 9 to the terminal 614 during the second half of the test pulse applied to the input terminal 18 and 18′ of the decoders 111 and 113.

It will be assumed for example that the pulses applied by the pulse generator 9 to the terminals 19, 19′ of decoders 112, 114 and to the terminal 604 have a duration of two microseconds, to the terminals 18, 18′ of decoders 111, 113 have a duration of one microsecond and to the terminals 614 a duration of one-half microsecond.

The "and-gate" constituted by the three diodes 611, 612, 613, provides a signal only if three pulses are applied simultaneously at 610, $60_s$ and 614. This happens if it is the moment of test defined by the short pulse applied to the common terminal 614, and if the element 151 is connected to the selected column determined by the presence of the negative pulse at the terminal $60_s$, and finally if in these conditions a pulse arrives at 610.

It has been shown above that this latter condition implies that the selected detection cell 141 provides a positive response.

All the elements such as 151 are connected to the output terminal 601 through an "or" circuit shown in FIG. 2 by a multiple symbol. The output 601 constitutes the only output of the rapid testing system. It results from the foregoing that this sole output can only provide a negative pulse if at the moment of test the only selected detection cell 141 provides a positive response and that in addition this selected detection cell alone will have its condenser 507 discharged during this test; all the other detection cells being protected against a useless discharge.

We claim:

1. A high speed memory testing device for testing the electrical condition of a plurality of channels comprising in combination a marking matrix having rows, columns and crosspoints operable to one of two alternate states in response to signals received over said channels and characterizing the electrical condition thereof; address register means divided into a first lower order row address register, a second upper order row address register, a third lower order column address register and a fourth upper order column address register; first, second, third and fourth decoders respectively connected to said registers; controlling means adapted to apply test pulses to said decoders; a row access matrix having rows connected to said first decoder, columns connected to said second decoder, crosspoints connected to the rows of the marking matrix and adapted to apply said test pulses to the rows of the marking matrix the number of which is registered in said row address registers; a column access matrix having rows connected to said third decoder, columns connected to said fourth decoder, crosspoints connected to the columns of the marking matrix; inhibiting gates inserted between said column access matrix and said marking matrix, said column access matrix being adapted to apply through said inhibiting gates said test pulses to the column of the marking matrix the number of which is registered in said column address registers, said inhibiting gates being connected in parallel to a single inhibiting input and a single general output and being responsive to said test pulses; whereby a given crosspoint of the marking matrix designated by the address register means and marked by its corresponding channel is operated to give an output signal, all the crosspoints of the same row of the marking matrix as the given crosspoint being inhibited.

2. A high speed memory testing device according to claim 1 in which said row-access and column access matrices are transistor matrices having respectively a transistor individual to each row and to each column of said marking matrix.

3. A high speed memory testing device according to claim 2 in which each transistor of said transistor matrices has its base and its emitter respectively connected to a row and to a column of said transistor matrices, and said controlling means are adapted to apply to said second and fourth decoders connected to said columns of said transistor matrices marking pulses of a given duration and to said first and third decoders connected to said rows of said transistors matrices reading pulses of a shorter duration beginning after and terminating before said marking pulses, whereby said transistors are controlled by base pulses and driven to saturation without reducing their operating speed.

No references cited.